US011297593B2

(12) United States Patent
Ramakrishnappa et al.

(10) Patent No.: US 11,297,593 B2
(45) Date of Patent: Apr. 5, 2022

(54) IDENTIFYING FIXED WLAN DEVICES USING MOBILITY PATTERNS

(71) Applicant: HEWLETT PACKARD ENTERPRISE DEVELOPMENT LP, Houston, TX (US)

(72) Inventors: Ganesh Valluru Ramakrishnappa, Karnataka (IN); Ataur Rehman, Karnataka (IN); Manaswini Lakshmikanth Sugatoor, Karnataka (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 192 days.

(21) Appl. No.: 16/352,990

(22) Filed: Mar. 14, 2019

(65) Prior Publication Data
US 2020/0296682 A1   Sep. 17, 2020

(51) Int. Cl.
H04W 64/00 (2009.01)
H04W 48/16 (2009.01)
H04B 17/17 (2015.01)
H04B 17/318 (2015.01)
H04W 24/10 (2009.01)
H04W 84/12 (2009.01)

(52) U.S. Cl.
CPC .......... H04W 64/006 (2013.01); H04B 17/17 (2015.01); H04B 17/318 (2015.01); H04W 24/10 (2013.01); H04W 48/16 (2013.01); H04W 84/12 (2013.01)

(58) Field of Classification Search
CPC ...... H04W 4/029; H04W 64/00; H04W 8/005
See application file for complete search history.

(56) References Cited

U.S. PATENT DOCUMENTS

| 6,915,135 | B1 | 7/2005 | McKee et al. |
| 9,648,116 | B2 | 5/2017 | Morton et al. |
| 2005/0055568 | A1 | 3/2005 | Agrawala et al. |
| 2005/0243722 | A1* | 11/2005 | Liu ........................ H04L 47/10 370/235 |

(Continued)

OTHER PUBLICATIONS

Jessica Thomas, "Presence Analytics explained", Blog Purple News, available online at <https://purple.ai/blogs/presence-analytics-explained/>, Jun. 29, 2014, 8 pages.

(Continued)

Primary Examiner — Elton Williams
(74) Attorney, Agent, or Firm — Sheppard Mullin Richter & Hampton LLP

(57) ABSTRACT

A method for classifying devices may include determining that a device is located at a location for more than a threshold amount of time and identifying that the device is a moving candidate based on a percentage of times a plurality of signal strength values for the device fall inside a baseline interval. The method may also include determining a most frequent pattern set of signal strength values for the device, classifying the device as fixed if the most frequent pattern set of signal strength values for the device includes at least one overlapping interval, and classifying the device as moving if the most frequent pattern set of signal strength values for the device includes at least one non-overlapping interval.

18 Claims, 8 Drawing Sheets

(56) References Cited

U.S. PATENT DOCUMENTS

2015/0351071 A1* 12/2015 Pandey ................. H04W 4/021
 455/456.1
2016/0345163 A1* 11/2016 Monaghan ............ H04W 4/025
2017/0309146 A1 10/2017 Mackenzie et al.

OTHER PUBLICATIONS

The Cisco CMX Presence Analytics Service, (Web Page), Retrieved Sep. 24, 2018, 13 Pgs.

* cited by examiner

IDENTIFYING FIXED WLAN DEVICES USING MOBILITY PATTERNS

BACKGROUND

Visitor presence at wireless local area network ("WLAN") sites may vary cyclically. Visitor presence may refer to users, which are visitors, such as customers and potential customers of an establishment that have devices that access or attempt to access the WLAN. As such, visitor presence may be determined by measuring a number of devices that access or attempt to access the WLAN. In addition to visitor presence, other devices, such as non-visitor devices may also access or attempt to access the WLAN. Such devices may include fixed devices within the WLAN, employee devices, and the like. Accordingly, a WLAN user presence may include access or attempted access by devices from both visitors and non-visitors within the WLAN.

Each day may have peak hours of high presence and nonpeak hours of low presence. In addition, each week may have days when presence is relatively high, e.g., working days or low, e.g., nonworking days. Each year may include seasonal presence cycles. Knowing the presence cycles typical for sites, network administrators may schedule updates, upgrades, and other work that may affect network performance during nonpeak hours when fewer users may be affected, or performance impacts may be less noticeable.

WLAN user presence at some sites may be correlated with the presence of employees, customers, or other visitors to the site location. The correlation is strongest at sites people visit specifically, or at least primarily, to use the network. Examples of such sites include Internet cafés, business centers at hotels, convention venues, transportation hubs, and workplaces where employees' duties are carried out using devices.

Some types of wireless access points sense the presence of devices within the reception range. The WLAN's discovery process identifies each device individually. This allows each user of a device to be tracked separately as it enters, stays in, and leaves an access point's reception range. A network management platform may store and/or analyze the data from single or multiple access points.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
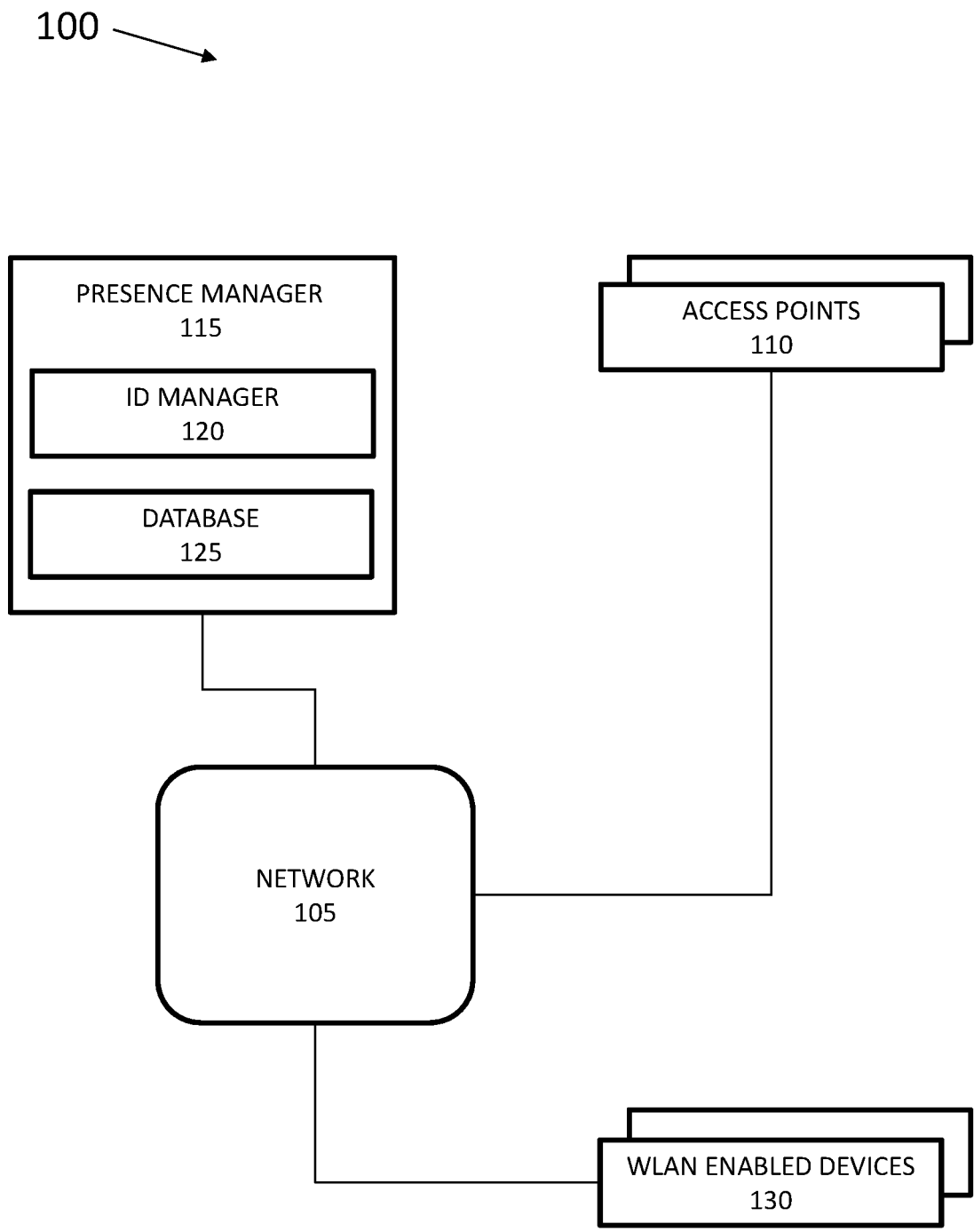
FIG. 1 is a schematic representation of a presence detection location, according to one or more examples of the disclosure.

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

WLAN user presence cycles interest network administrators and other information technology ("IT") professionals that need to plan sufficient capacity for peak times and find ways to save overhead costs during nonpeak times. Certain users in underprovided locations are also interested in WLAN user presence cycles. If the network is so busy at peak hours that their applications crash or slow down unexpectedly, they want to save the most demanding work for nonpeak hours.

Human visitor presence cycles, which may correlate in varying degrees with WLAN user presence cycles, are of interest to a broad range of parties. For example, business owners want to predict their busiest and least busy times so that staffing and other resource availability are allocated accordingly. Some customers may want to avoid crowds by visiting stores, theaters, and other venues at less popular times. Employers offering flexible work hours may want to stock break rooms for when most employees are on site and reduce climate control in unused rooms when the fewest employees are there. Emergency responders may find it helpful to know whether the location of an incident is likely to be crowded or uncrowded.

Existing solutions in the analytics of WLAN user presence may use any of a variety of data collection techniques. Some existing solutions may track a business's sales volume over time to determine presence cycles. This may involve access to a feed from the business's cash register or information from financial entities, such as credit card companies, facilitating the transactions. Such access may be complicated by automated security and privacy precautions.

Besides, this approach does not account for visitors who are present but do not make purchases. Some existing solutions may track client devices that use a particular application to navigate the space or find special offers. This approach does not account for visitors who do not have the application, or who have it but do not open it and use it for their present errand. Some existing solutions track clients that have location services, such as global positioning service ("GPS"), enabled. Some users, however, habitually turn their client devices' location services off except when specifically needed, either because of privacy perceptions or because location services historically consumed battery power quickly.

Once presence data is collected and stored for a desired length of time, presence cycles may be extracted. Some existing solutions may extract cycles directly from the raw time-dependent presence data. This data may be a superposition of many functions, both cyclic and noncyclic. Daily, weekly, monthly, and seasonal cycles, as well as long-term growth or decline in anomalous one-time events, may all contribute to the time-dependent data so that each contribution may be distorted by all the others. Averaging, curve fitting, slope correction, and other smoothing techniques in the time domain may remove some distortions, but in some instances, they may mask meaningful information.

While the methods described above may be useful in identifying presence of a device at a location, external factors may result in incorrect presence analysis. For example, fixed devices at particular locations may be identified and considered in presence analysis. Fixed devices may refer to devices that are always on, or on for specific prolonged periods of time, at a particular location. Examples of fixed devices may include televisions, wireless access points, cash registers, employee cellular devices, security cameras, and the like. Inclusion of fixed devices in determining presence information may result in a visitor client count being higher than actual. Additionally, the average time a visitor stays at a location, i.e., the dwell time, may also be higher than actual because the fixed device may be included in the dwell time calculation. Dwell time may refer to the amount of time a device remains within a WLAN area. As dwell time for fixed devices may be relatively high, the calculated average dwell time may also be higher than the actual average dwell time by the WLAN users or visitors when the data from the fixed devices are included.

Examples disclosed herein may provide systems and methods to more accurately identify visitor client counts and dwell times for visitors to specific locations. By identifying fixed devices using a signal strength indicator, such as a received signal strength indicator ("RSSI") and excluding the fixed devices from visitor client count calculations, the accuracy of presence analysis may be increased. In addition to generating more accurate visitor presence analysis, identification of fixed devices may allow the health of the fixed devices to be monitored. As such, should a fixed device stop responding, an alert may be raised, indicating that the fixed device may not be functioning as expected. Furthermore, information about the fixed devices may be stored in a persistent database. The database may be updated periodically, or on-demand, for a particular location, thereby providing a current list of fixed devices for the location.

Turning to FIG. 1, a schematic representation of a presence detection location 100, according to one or more examples, is shown. Presence detection location 100 may include various types of businesses, including retail shops, restaurants, sporting venues, governmental locations, parks, and any other location that has wireless communication technology. Examples of wireless communication technology may include cell phones, smart televisions, registers, routers, servers, computing devices, and the like.

Presence detection location 100 includes a network 105. Network 105 may include any type of wireless network such as, for example, a WLAN, a wireless personal area network ("WPAN"), a wireless metropolitan area network ("WPAN"), a wireless wide area network ("WWAN"), a cellular network, a global area network ("GAN"), or any other type of network 105 through which communication from multiple wireless communication technology devices may occur. In this example, network 105 may be a WLAN located at a retail establishment.

Network 105 may be used to connected various types of devices. For example, network 105 may be used to connect one or more access points 110. In certain implementations, access points 110 may include wireless access points 110 that detect and relay client presence information within network 105. Examples of access points 110 may include a wireless communication technology that is WLAN compliant with IEEE 802.11 standards, or any future successor standard. Access points 110 may be a networking hardware device that allows other WLAN devices to connect through network 105, and may include, for example, a standalone device that connects to a router or access points 110 may be integral components within a router.

Network 105 may also be used to connect a presence manager 115. Presence manager 115 may be a computing device that includes various components and data structure for receiving and processing information supplied by access points 110 and other devices that may be connected through network 105. Presence manager 115 may include hardware and/or programming instructions configured to share information. The hardware, for example, may include one or more processors and memory, e.g., computer-readable medium ("CRM"), machine readable medium ("MRM"), database, etc. The processors may include any set of processors capable of executing instructions stored by the memory. The processors may be implemented in a single device or distributed across multiple devices. The program instructions, e.g., computer readable instructions ("CRI") may include instructions stored on the memory and executable by the processors to implement a desired function.

The memory may be in communication with the processor. The memory may include any set of memory components capable of storing instructions that may be executed by the processor. The memory may be a non-transitory CRM or MRM. The memory may also be integrated in a single device or distributed across multiple devices. Further, the memory may be fully or partially integrated in the same apparatus as the processor or it may be separate but accessible to that processor. Presence manager 115 may be implemented on a participant device, on a server device, on a collection of server devices, or a combination of the participant device and the server device.

In certain implementations, presence manager 115 may include an identification manager 120. Identification manager 120 may be a module within presence manager 115 that provides functionality to process information provided by access points 110 and other WLANWLAN enabled wireless communication technology that is present at presence detection location 100. Presence manager 115 may also include a database 125 that stores information from access points 110, other WLAN enabled wireless communication technology that is present at presence detection location 100, as well as data processed by identification manager 120. While a single database 125 is illustrated, multiple databases 125 may also be used to store particular types of information sent to and provided by presence manager 115 and/or identification manager 120.

Network 105 may also be used to connect various types of WLAN enabled devices 130 disposed statically or dynamically at presence detection location 100. Examples of WLAN enabled devices 130 may include cell phones, computing devices, tablets, smart televisions, registers, servers, routers, etc. Static WLAN enabled devices 130 may refer to devices that remain at presence detection location 100 as fixtures, such as a register or smart television. Static WLAN enabled devices 130 may be referred to herein as fixed. Dynamic WLAN enabled devices 130 may refer to devices that transiently come into contact with presence detection location 100, such as cell phones of visitors, customers, and the like. Dynamic WLAN enabled devices 130 may be referred to herein as moving.

In certain implementations, fixed WLAN enabled devices 130 may include certain WLAN enabled devices 130 that may appear to be moving. Examples of such fixed WLAN enabled devices 130 may include cell phones of employees that are at a location at various times throughout the week. An explanation of fixed WLAN enabled devices 130 that appear to be moving will be provided in detail below.

In an example implementation, presence detection location 100 may be a restaurant having network 105. Network 105 may be used to connected one or more access points 110, as well as presence manager 115. Presence detection location 100 may also include one or more fixed WLAN enabled devices 130, such as a smart television and a register. The fixed WLAN enabled devices 130 may also be connected to network 105, thereby allowing communication with and through access points 110 and presence manager 115. Presence detection location 100 may also include moving WLAN enabled devices 130, such as customers, that pass within range of access points 110.

When customers pass within range of access points 110, their WLAN enabled devices 130 may initiate a probe request with access points 110. The probe request may refer to a request to discover a service set identifier ("SSID") associated with network 105. For example, the probe request may request the SSID for an 802.11 WLAN, thereby allowing the WLAN enabled devices 130 to know whether there is an available network in the area. Probe requests occur periodically when the WLAN function of WLAN enabled devices 130 is turned on. In this example, all customers with WLAN enabled devices 130 that have WLAN turned on may send probe requests to access points 110 to discover network 105.

Access points 110 may receive the probe request, and thereby know that one or more WLAN enabled devices 130 are within presence detection location 100. When access points 110 receive the probe request, the access point 110 may know the strength of the signal, such as may be defined as a received signal strength indicator ("RSSI"). The RSSI is a measurement of the power present in a received signal, in this implementation, the strength of the probe request. RSSI may be expressed as decibels relative to a milliwatt ("dBm"). The range of dBm is generally from zero to −120, where the closer to 0 the RSSI, the strong the signal. For example, an RSSI of −10 dBm is stronger than −50 dBm, which is stronger than −80 dBm. In other implementations, rather than RSSI, WLAN signal strength may be represented as a quality in percentage expressed as a value between zero and 100, where the larger the number, the stronger the signal. For example, a value of 100 is stronger than a value of 0.

When WLAN enabled devices 130 send probe requests to access points 110, the RSSI for the probe request may be sent to presence manager 115. Presence manager 115 may store the RSSI for particular WLAN enabled devices 130 in database 125. The data received from access points 110 and/or WLAN enabled devices 130 may be referred to herein as presence data. Periodically, identification manager 120 may access the presence data in database 125 in order to determine information about WLAN enabled devices 130. For example, identification manager 125 may determine how long the WLAN enabled devices 130 has been at presence detection location 100. The time WLAN enabled devices 130 remain at presence detection location is referred to herein as dwell time.

Dwell time may be useful in determining information about customers interactions at presence detection location 100. For example, the dwell time may be used to determine how many potential customers, e.g., passersby, result in actual customers. Passersby may have a relatively short dwell time because they only come into contact with access points 110 for a short period of time. In contrast, customers may spend substantially more time at presence detection location 100, thereby resulting in a relatively longer dwell time. Dwell time may also be used to determine how long customers remain at a specific presence detection location 100. Such dwell time analytics may be used to modify business practices to encourage more passersby to become customers and/or to keep customers longer or to decrease a customer stay time.

While dwell time provides a representation of interaction between customers and presence detection location 100, the average dwell time may be skewed due to an inability to distinguish between fixed and moving WLAN enabled devices 130. The distinction between fixed and moving WLAN enabled devices 130 is discussed in detail below.

For example, dwell time may be used to determine whether a specific WLAN enabled device 130 is fixed or moving. In the example discussed above, the register and/or smart television may have a relatively long dwell time because they are substantially continuously turned on. Such WLAN enabled devices 130 may continue to send probe requests to access points 110 because they are not turned off. WLAN enabled devices 130 with a long dwell time may thereby be identified as fixed devices.

Dwell time may also be determined for moving devices. In the example provided above, examples of moving devices may include customers with WLAN enabled devices 130, such as cell phones. When WLAN enabled devices 130 of the customers come within range of access points 110, a probe request may be sent to access point 110. Subsequent probe requests may be sent to access points 110 so long as WLAN enabled devices 130 are within range. When WLAN enabled devices 130 move out of range of network 105, access points 110 may quit receiving probe requests. As the time a customer stays at presence detection location 100 may be less than that of fixed devices, the WLAN enabled devices 130 of customers may be determined to be moving. As such, moving devices may be separated from fixed devices. Presence data may be sent to presence manager 115, which may then determine the dwell time for a particular WLAN enabled device 130 that is a moving device.

By distinguishing between fixed devices and moving devices the average dwell time for moving devices, which are more likely to be customers, may be more accurately determined. In order to exclude fixed devices, a dwell time threshold may be established for presence manager 115. For example, a dwell time threshold may be set to one day. Any device that has a dwell time of one day or more may then be considered a fixed device. In another implementation, a dwell time of more than one day or a set number of hours, e.g., 6 hours, 12 hours, 18 hours, etc., may be used to exclude fixed devices.

While excluding fixed devices may increase the accuracy of average dwell time calculations, certain situations may occur at presence detection locations 100 that result in certain WLAN enabled devices 130 being misidentified. For example, a calculation of dwell time may result in a false negative for a fixed device, thereby misidentifying a fixed device as a moving device. Additionally, the calculation of dwell time may result in a false positive for a fixed device, thereby misidentifying a moving device as a fixed device.

Examples of when such misclassification may occur include when presence detection location 100 powers off certain devices, such as at the end of the working hours. If the dwell time was set to a period more than the working hours, the device may report as a false negative. Other examples of misidentification may occur if a customer stays longer than normal, such as spends a long period of time at a restaurant or checks into a hotel and stays for several days. To decrease the occurrence of false negatives and false positives, dwell time may be combined with RSSI to identify WLAN enabled devices 130 as either fixed or moving.

Figure 2:
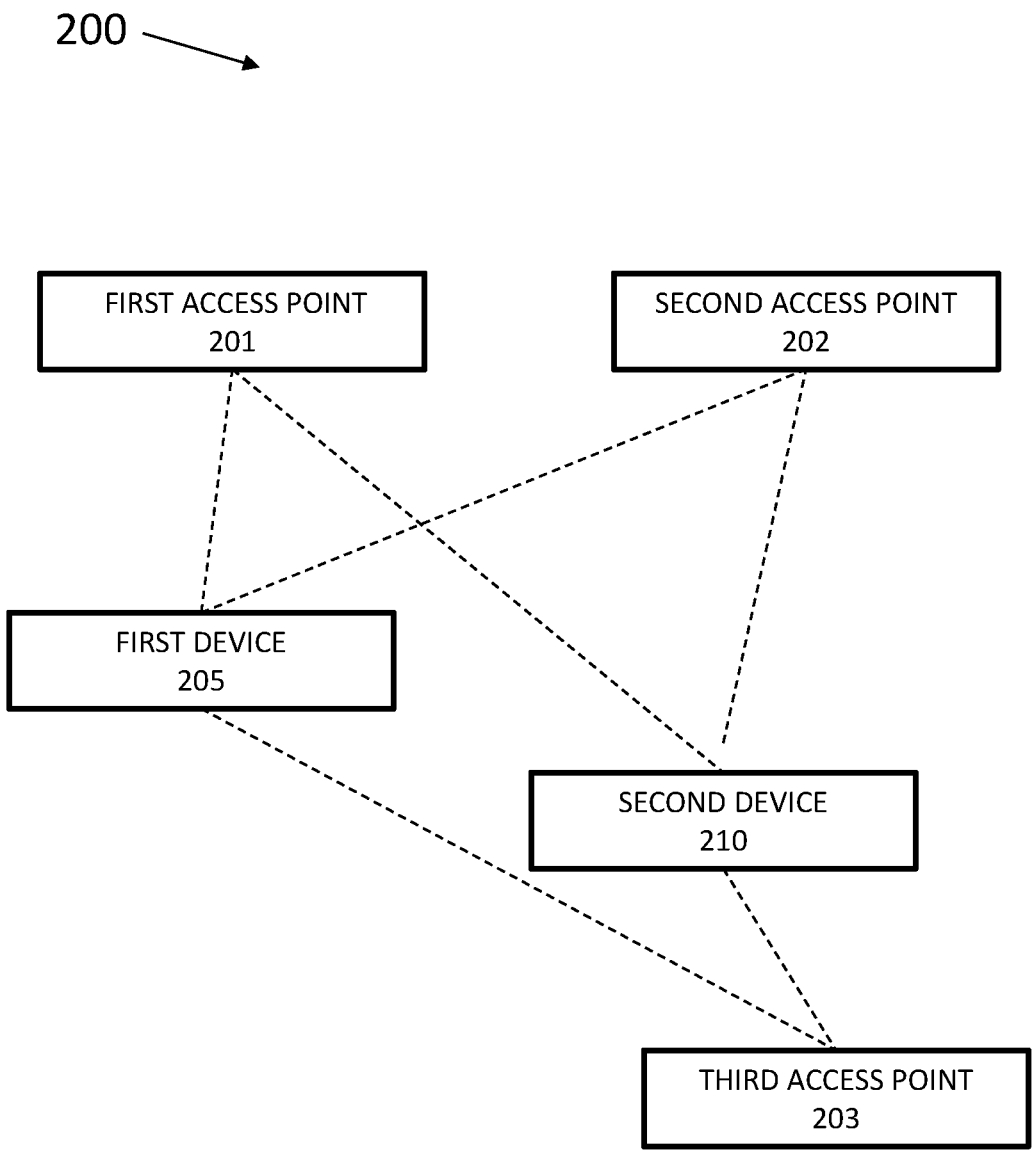
FIG. 2 is a schematic representation of a presence detection location, according to one or more examples of the disclosure.

Turning to FIG. 2, a schematic representation of a presence detection region 200, according to one or more examples is shown. Presence detection location 200 may refer to a geographic or physical region with WLAN deployment that is capable of performing presence analytics to detect user and/or visitor presence information. In this implementation, presence detection region 200 may include three access points identified as a first access point 201, a second access point 202, and a third access point 203. Presence detection region 200 may further include two fixed devices identified as a first device 205 and a second device 210. Both first device 205 and second device 210 may communicate with each of first access point 201, second access point 202, and third access point 203. The connections between the access points 201, 202, and 203, and fixed devices 205 and 210 are represented as dashed lines.

As illustrated, first device 205 may be relatively close to first access point 201, farther from second access point 202, and still farther from third access point 203. Accordingly, the signal strength may be relatively strong between first device 205 and first access point 201, weaker between first device 205 and second access point 202, and weakest between first device 205 and third access point 203. Similarly, second device 210 may be relatively close to third access point 203, farther from second access point 202, and still farther from first access point 201. Accordingly, the signal strength may be relatively strong between second device 210 and third access point 203, weaker between second device 210 and second access point 202, and weakest between second device 210 and first access point 201.

As discussed above, signal strength may be represented as a RSSI value. In this implementation, the RSSI value between first device 205 and first access point 201 may be −20 dBm, the RSSI value between first device 205 and second access point 202 may be −50 dBm, and the RSSI value between first device 205 and third access point may be −80 dBm. Similarly, the RSSI value between second device 210 and fist access point 202 may be −70 dBm, the RSSI value between second device 210 and second access point 202 may be −80 dBm, and the RSSI value between second device 210 and second access point 202 may be −25 dBm.

As first device 205 and second device 210 do not move, the relative strength of the signal between each of the first access point 201, second access point 202, and third access point 203 may remain relatively constant. For example, signal strength may not remain static, however, the signal strength would be expected to remain within a relatively small range. In one implementation, the range may be plus or minus 5 dBm. As such, the RSSI value between first device 205 and first access point 201 may be expected to remain between −15 dBm and −25 dBm. In other implementations, the range may be different. Other ranges may include plus or minus 3 dBm, 7 dBm, 10 dBm, and/or other ranges as determined for a particular presence detection location 200.

In operation, the presence manager (115 of FIG. 1) may receive presence data from first access point 201, second access point 202, and third access point 203. The presence data may include RSSI values between first device 205 and first access point 201. The presence data may be received over a period of time, for example, for a day. Additionally, the presence manager may have a dwell time threshold value of 4 hours. The dwell time threshold value refers to the amount of time over which a device may be classified as fixed.

After 4 hours, first device 205 may still send probe requests to access point 201. As the probe requests have been sent for more time than defined by the dwell time threshold value, presence manager may determine that first device 205 is a possible fixed device. To determine whether first device 205 is fixed, or whether there is a misidentification, the RSSI values for the connection between first device 205 and first access point 201 may be evaluated. The presence manager may be provided or otherwise calculate a device baseline RSSI interval. The baseline RSSI interval may be provided by running a baselining algorithm on the RSSI values sent from first device 205 to first access point 201 for a defined period of time. Baselining may thereby isolate the most common RSSI values, defined within a range. Suitable baselining algorithms may include, for example, unsupervised machine learning via a one class support vector machine ("SVM").

For example, the RSSI values between first device 205 and first access point 201 may be collected for a certain time period, and as such, over that time period hundreds or thousands of RSSI values may be collected. After collection of the RSSI values, the baselining algorithm may determine that the baseline RSSI interval resulted in a single interval between −20 dBm and −24 dBm. During the collection of RSSI values, some RSSI values may fall outside of the baseline RSSI interval. For example, first device 205 may provide a signal strength of −26 dBm or less than 20 dBm on certain occasions.

To determine if a device is fixed, the total number of RSSI values may be compared against the number of RSSI values that fall within the baseline RSSI interval. For example, a RSSI value percentage may define the number of RSSI values that fall within the baseline RSSI interval. In one implementation, the RSSI value percentage may be defined as 90 percent. In other implementations, the RSSI value percentage may be defined as greater than 50 percent, 75 percent or more 95 percent or more, of any value that allows for the identification of fixed devices at a particular location. In this example, if the RSSI value percentage is 90 percent, if the number of RSSI values for the device falls within the baseline RSSI interval, then the device may be considered fixed.

If the percentage of RSSI values returned are less than 90 percent, then first device is not considered fixed and becomes a moving candidate device. A moving candidate device is a device that cannot be considered fixed based on either dwell time or through baselining; however, may still be a fixed device, thereby requiring additional analysis. In this implementation, first device 205 returns RSSI values within the single baseline RSSI interval, more than 90 percent of the time. Accordingly, first device 205 is determined to be a fixed device, and no further analysis may be performed. First device 205 may thus be stored as a fixed device within the presence manager and excluded from analysis of patterns involving moving devices.

Additionally, because first device 205 is determined to be a fixed device, should first device 205 stop sending probe requests, the presence manager may provide an alert indicating that first device 205 is not functioning normally. A user may then access first device 205 to determine if there is a problem, and if a problem is found, remediate the problem. Remediation may include updating aspects of first device 205, such as hardware and software, as well as potentially replacing first device 205 or components thereof.

While first device 205 is determined to be fixed, other devices that may exceed the threshold dwell time may be moving devices. In order to further explain the determination that a moving device is not a fixed device, even if the device exceeds the threshold dwell time, second device 210 is analyzed in FIG. 3

Figure 3:
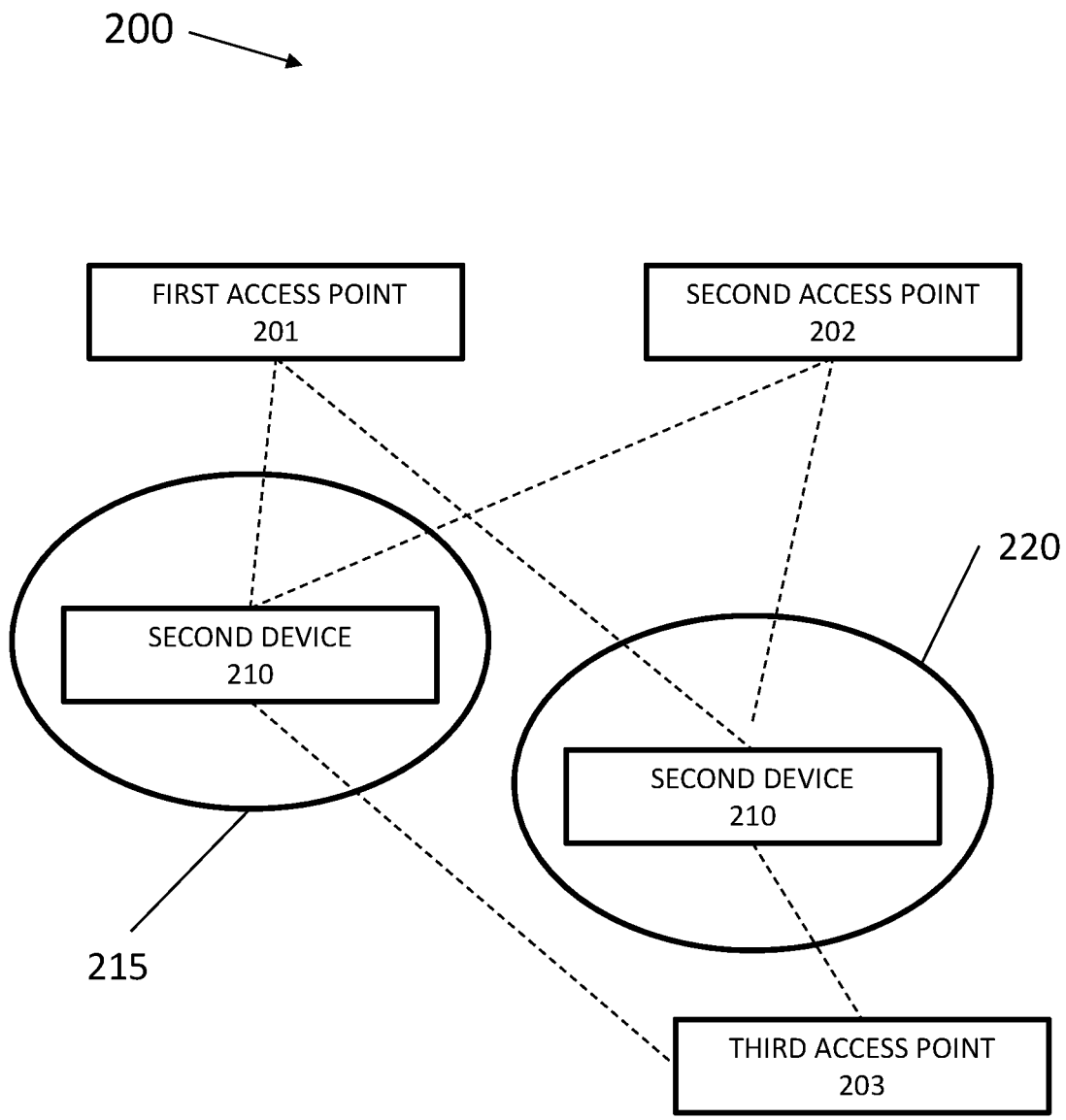
FIG. 3 is a schematic representation of a presence detection location, according to one or more examples of the disclosure.

Turning to FIG. 3, a schematic representation of a presence detection region 200, according to one or more examples is shown. In this example, the first device (205 of FIG. 2) has been removed, as the presence manager (115 of FIG. 1) has determined that the first device is fixed. In analyzing second device 210, the signal strength between second device 210 and first access point 201, second access point 202, and/or third access point 203 may be determined. As explained above, the RSSI values for second device 210 at first access point 201, second access point 202, and/or third access point 203 may be stored in the presence manager. As above, a threshold dwell time of 4 hours may be provided to the presence manager. After more than 4 hours, second device 210 may still send probe requests to one or more of first access point 201, second access point 202, and/or third access point 203. As such, second device 210 may be identified as a potential fixed device.

To determine whether second device 210 is fixed, or whether there is a misidentification, the RSSI values for the probe requests between second device 210 and one or more of first access point 201, second access point 202, and third access point 203 may be evaluated. In certain implementations the RSSI values may be analyzed with respect to a single access point, while in other implementations, the RSSI values may be analyzed for more than one of the access points. For clarity, only the RSSI values for probe requests between second device 210 and first access point 201 are discussed herein.

As explained above, the presence manager may be provided a baseline RSSI. The baseline RSSI may be provided by running a baselining algorithm on the RSSI values sent from second device 210 to first access point 201 for a defined period of time. Baselining may thereby isolate the most common RSSI values. As such, if a certain percentage of the RSSI values fall within the RSSI baseline value determined by baselining, second device 210 may be determined to be fixed. As above, in this example, the percentage of RSSI values that may fall within the RSSI baseline interval for second device 210 to be determined to be fixed may be 90 percent.

In this example, second device 210 does not return RSSI values that fall within the RSSI baseline interval at least 90 percent of the time. However, that does not mean that second device 210 is necessarily fixed, rather, it means that second device 210 is a moving candidate device. In order to rule out false positives, meaning that if second device 210 is moving it should not be classified as fixed, a second phase of analysis may occur. In other implementations, baselining the RSSI values may result in more than a single interval. For example, baselining may result in two or more intervals. When more than one interval is determined, the device may also be considered a moving candidate device.

To prevent false positives, the most frequent patterns of RSSI interval may be mined. RSSI interval refer to a range within which an RSSI value may fall. For example, an RSSI interval of [−45 dBm, −50 dBm] may represent that the reported RSSI value falls between −45 dBm and −50 dBm. The most frequent patterns of RSSI intervals may be determined using a close itemset algorithm, such as FP-Close.

If the most frequent patterns of RSSI intervals contain a single RSSI interval or many RSSI intervals with overlapping boundaries, then the device may be determined to be fixed. If, however, the most frequent patterns of RSSI intervals contain many RSSI intervals with at least one non-overlapping boundary, then the device may be determined to be moving. As an example, if the most frequent patterns of RSSI intervals return many probe requests that occur within the same RSSI interval, such as [−45 dBm, −50 dBm], then the device may be fixed. Similarly, if the most frequent patterns of RSSI intervals return many RSSI intervals with at least one overlapping value, such as [−45 dBm, −50 dBm], [−50 dBm, −55 dBm], [−45 dBm, −50 dBm], then the device may also be considered fixed. In the example of at least one overlapping boundary, the value of −50 dBm for the most frequent patterns provides overlap between the RSSI intervals.

However, if a device includes many RSSI intervals with at least one non-overlapping boundary, such as, [−45 dBm, −50 dBm], [−70 dBm, −75 dBm], [−30 dBm, −35 dBm], then the device may be determined to be moving. As exceptions to the most frequent patterns are removing during mining the RSSI values, the above non-overlapping patterns may be used to determine if the device is moving.

Referring specifically to the example in FIG. 3, as second device 210 does not return RSSI values that fall within the single interval at least 90 percent of the time, the second phase of analysis may occur. In this example, second device 210 returns values from a first location 215 for a period of time, and then from a second location 220 for a period of time. In determining the frequent patterns of RSSI intervals, there may be many RSSI intervals with at least one non-overlapping boundary. For example, when second device 210 is located within first location 215, second device 210 may return RSSI intervals that fall within [−45 dBm, −50 dBm]. However, when second device 210 is located within second location 220, second device 210 may return RSSI intervals that fall within [−70 dBm, −75 dBm]. As there is no overlap between RSSI interval [−45 dBm, −50 dBm] and RSSI interval [−70 dBm, −75 dBm], second device 210 may be determined to be moving.

As second device 210 is determined to be a mobile device, second device 210 may be considered a visitor device. The device may then be used in dwell time calculations of visitor devices in order to determine visitor patterns, visitor counts, and other information about visitors to certain locations. Other examples implementations and methods of using such implementations are discussed in detail below.

Figure 4:
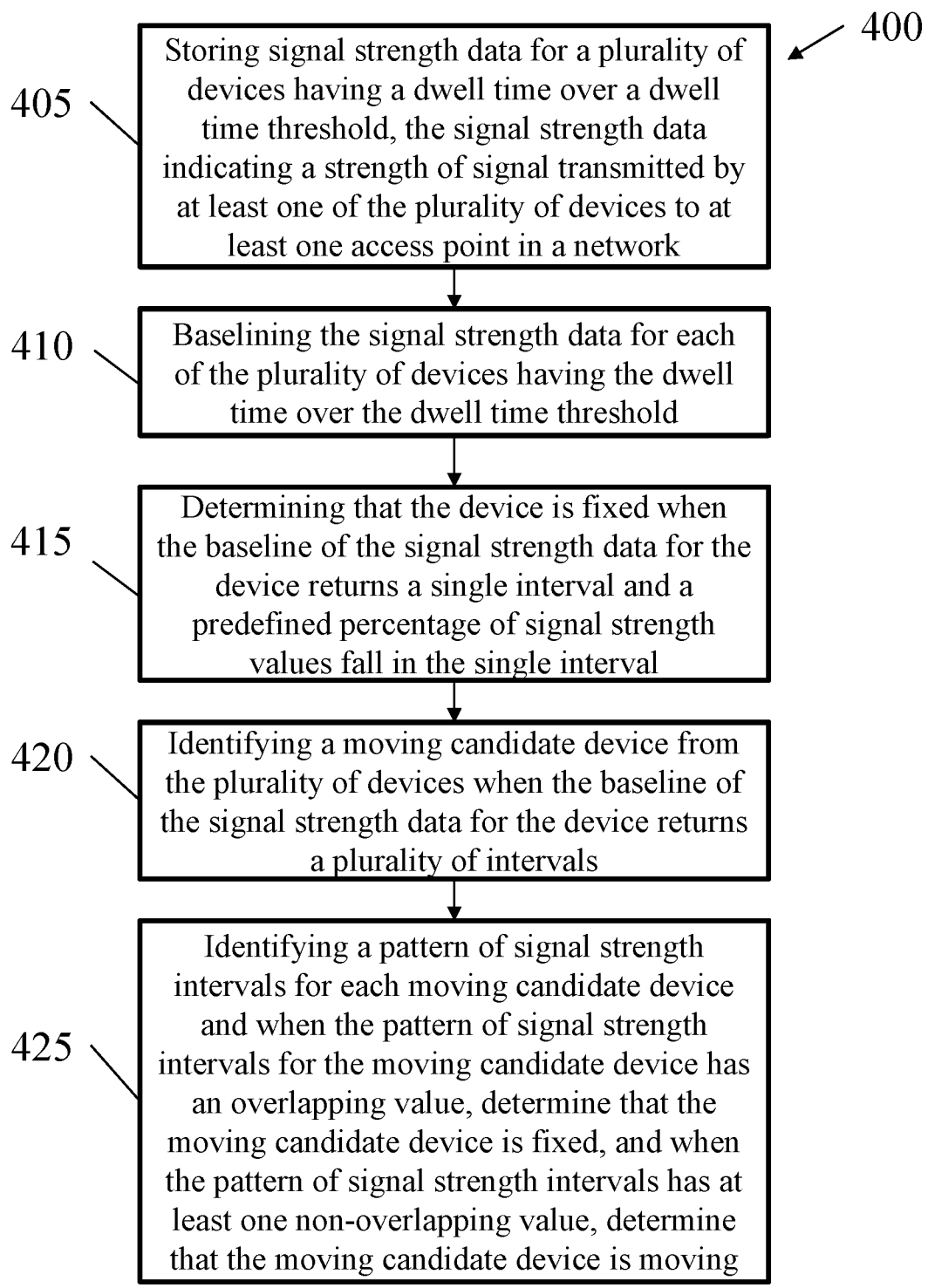
FIG. 4 is a flowchart depicting a method for classifying a device, according to one or more examples of the disclosure.

Turning to FIG. 4, a flowchart depicting a method for classifying a device, according to one or more examples, is shown. In operation, method 400 may include storing (block 405) signal strength data for a plurality of devices having a dwell time over a dwell time threshold, the signal strength data indicating a strength of signal transmitted by at least one of the plurality of devices to at least one access point in a network. The signal strength data may include RSSI data, as well as any other type of data representative of the strength of a signal between a device and a network access point. The plurality of devices may include devices that come in contact with a presence region for a period of time that exceeds the predefined dwell time threshold. For example, a dwell time threshold may be defined as a specified period of time, e.g., 2 hours. A device that is within the presence region more than 2 hours may thereby exceed the dwell time threshold. The dwell time threshold may allow for actual visitors to a presence region to be filtered out from passersby to the presence region.

In one example, a retail establishment may define a dwell time threshold of 30 minutes. As probe requests are sent from devices within the range of access points within the retail establishment, some of the devices that send probe requests to access points within the retail establishment may only send probe requests for a couple of minutes. Those devices would then be filtered out, as the devices are most likely not visitors to the retail establishment. The devices that send probe requests for 30 minutes or more may be considered visitors to the retail establishment, as they were within range of the access points within retail establishment for more than the dwell time threshold of 30 minutes.

The dwell time threshold may vary according to the trends of visitors to specific presence regions. For example, dwell time threshold may be relatively quick for fast food type restaurants, while it may be relatively longer for sit down type restaurants. Similarly, the dwell time threshold may vary based on the type of retail establishment, governmental establish, finance institution, entertainment venue, and the like.

In operation, method 400 may include baselining (block 410) the signal strength data for each of the plurality of devices having the dwell time over the dwell time threshold. A device baseline signal strength, such as a baseline RSSI may be determined by baselining all signal strength values for probe requests between a particular device and one or more access points within the presence region.

In operation, method 400 may include determining (block 415) that the device is fixed when the baseline of the signal strength data for the device returns a single interval and a predefined percentage of signal strength values fall in the singe interval. The predefined percentage of signal strength values may include a percentage of signal strength values that fall within the single interval. For example, the predefined percentage of signal strength values may be defined as 90 percent. In such an implementation, if 90 percent or more of the signal strength values for a device fall within the single interval, the device may be determined to be fixed. In other implementations, the predefined percentage of signal strength values may include other percentages, such as 50 percent or more, 75 percent or more, 80 percent or more, 95 percent or more, or other percentages as may be appropriate for a particular presence region.

In certain implementations, method 400 may also include determining that the device is a moving candidate device when the baseline of the signal strength data returns a single interval and the predefined percentage of signal strength values do not fall in the single interval. For example, if the baselining returns a single interval and the predefined percentage of signal strength values is 90 percent, but only 80 percent of the signal strength values fall in the single interval, the device may not be fixed. As such, the device may be classified as a moving candidate device, and additional analysis may be undertaken.

In operation, method 400 may include identifying (block 420) a moving candidate device from the plurality of devices when the baseline of the signal strength data for the device returns a plurality of intervals. The plurality of intervals may thereby indicate that the signal strength values are changing with enough frequency that the device cannot be determined to be fixed. As such, additional analysis may be performed on the moving candidate device to determine whether the device is fixed or moving. Determining whether the device is fixed or a moving candidate device may thereby allow false negatives to be reduced, i.e., a device may not be classified as moving if it is fixed.

In operation, method 400 may include identifying (block 425) a pattern of signal strength intervals for each moving candidate device and if the pattern of signal strength intervals for the moving candidate device has an overlapping value, determine that the moving candidate device is fixed, and if the pattern of signal strength intervals has at least one non-overlapping value, determine that the moving candidate device is moving. The pattern of signal strength intervals may be determined by identifying most frequent patterns, as discussed in detail above. The most frequent patterns may be determined by mining the signal strength data for a devices probe requests to an access point within a presence region using, for example, a close itemset algorithm. By identifying the patterns of signal strength intervals, false positives may be removed, i.e., a device may not be classified as a fixed device if it is moving.

In certain implementations, a set of fixed devices stored in a database may be updated by repeating the operations explained in detail above. A set of fixed devices that may be maintained, thereby allowing information about the fixed devices to allow additional actions. For example, if a fixed device stopped sending probe requests, a user may be alerted that the device is not functioning as expected.

In other implementations, rather than use signal strength values received from a single access point, signal strength values may be analyzed from multiple access points, thereby allowing for the more accurate determination of fixed and moving device.

In still other implementations a determination may be made as to whether one or more of the plurality of devices are a visitor device. This determination may occur as a result of identifying moving devices that remain at a location for a period of time and are moving while at the location. In certain implementations, an average dwell time may be determined based on the dwell times of each of the visitor devices. Because the list of visitor devices excludes fixed devices, the list of visitor devices may be more accurate, thereby resulting in more accurate average dwell time calculations.

Figure 5:
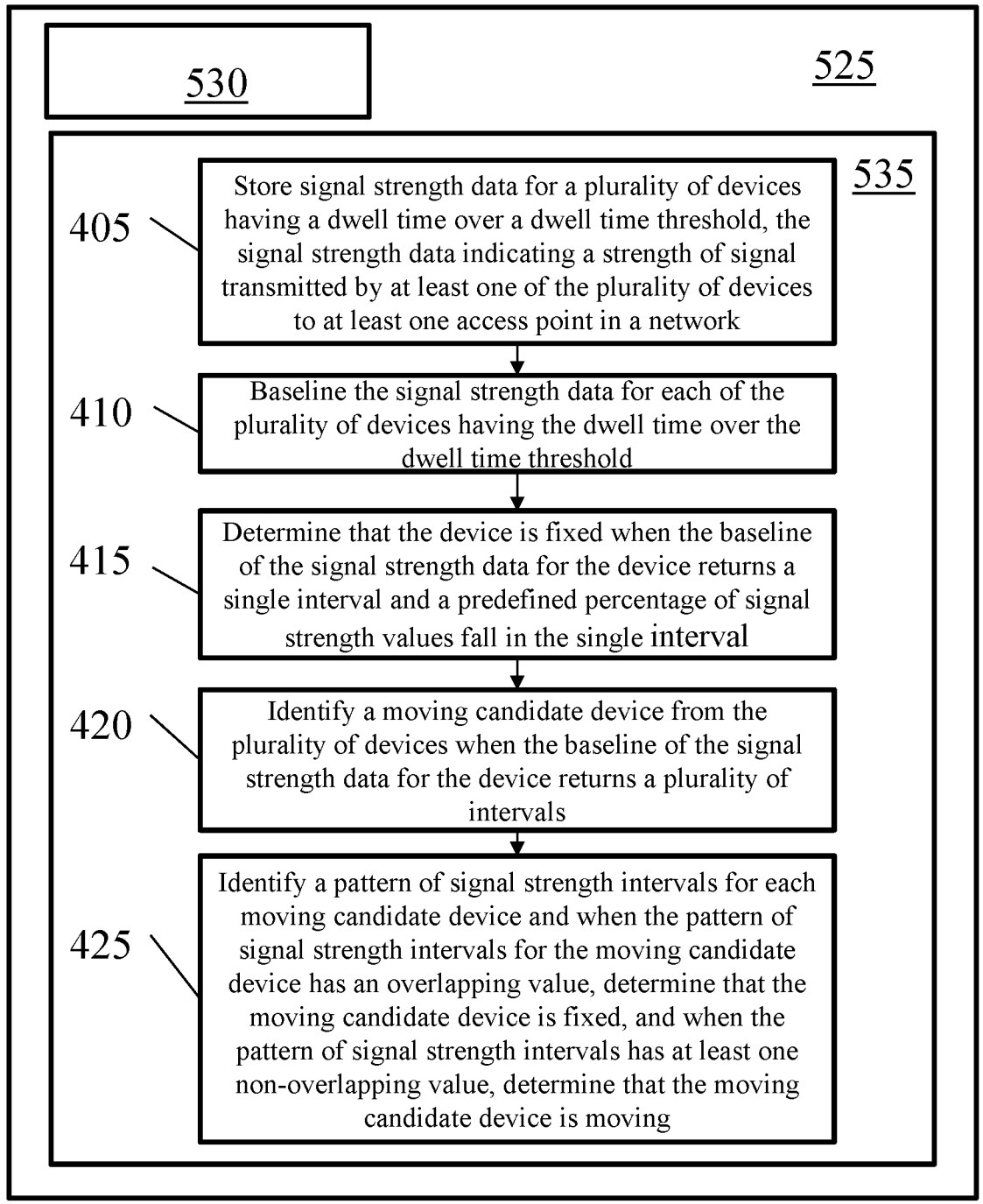
FIG. 5 is an example computing device with a hardware processor and accessible machine-readable instructions, according to one or more examples of the present disclosure.

Turning to FIG. 5, an example computing, device with a hardware processor and accessible machine-readable instructions is shown in accordance with one or more examples of the present disclosure. FIG. 5 provides an example computing device 525, with a hardware processor 530, and accessible machine-readable instructions stored on a machine-readable medium 535 for generating information about a product as discussed above with respect to one or more disclosed example implementations. FIG. 5 illustrates computing device 525 configured to perform the flow described in blocks 405, 410, 415, 420 and 425, discussed in detail with respect to FIG. 4. However, computing device 525 may also be configured to perform the flow of other methods, techniques, functions, or processes described in this disclosure.

A machine-readable storage medium, such as 535 of FIG. 5, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory ("EPROM"), random access memory ("RAM"), non-volatile random access memory ("NVRAM"), optical disk, solid state drive ("SSD"), flash memory chips, and the like. The machine-readable storage medium may be a non-transitory storage medium, where the term "non-transitory" does not encompass transitory propagating signals.

Figure 6:
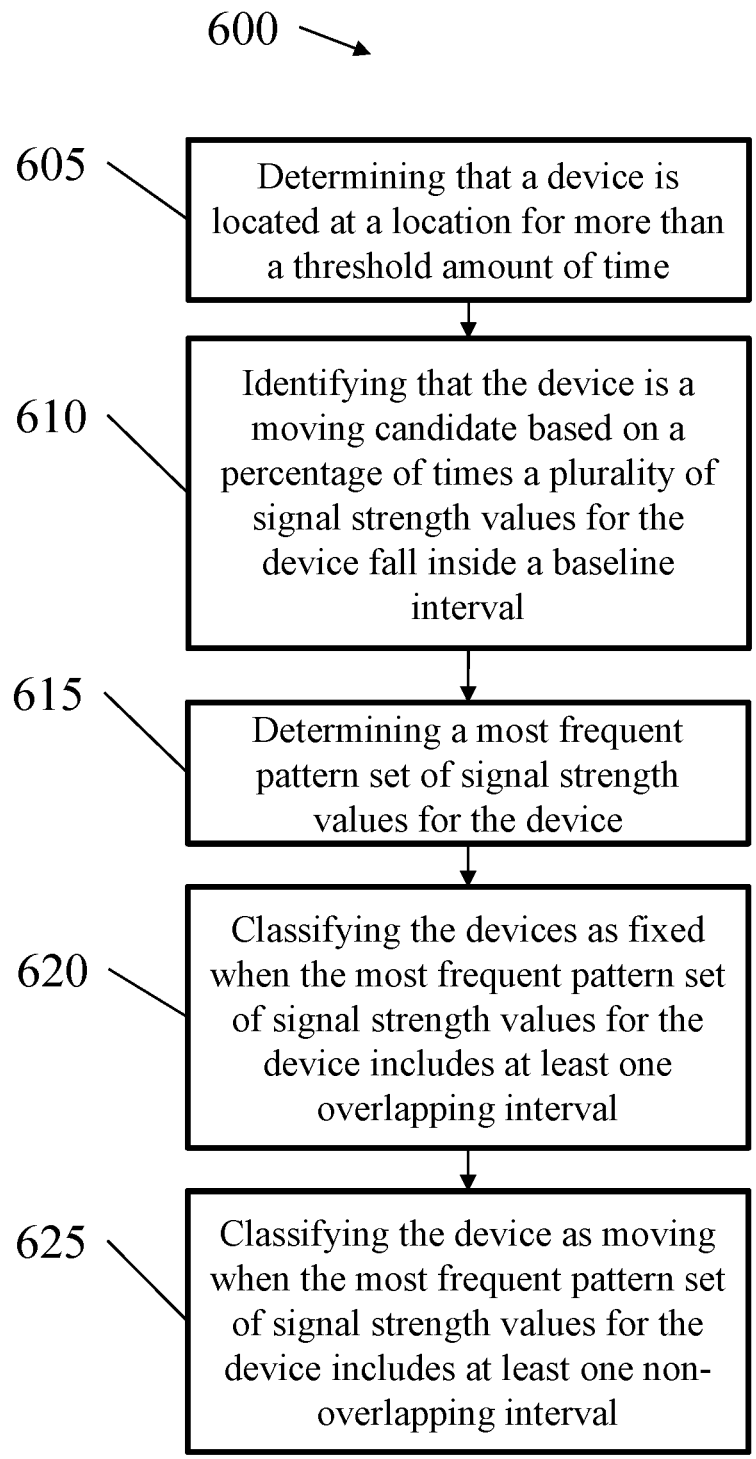
FIG. 6 is a flowchart depicting a method for classifying a device, according to one or more examples of the disclosure.

Turning to FIG. 6, a flowchart depicting a method for classifying a device according to one or more examples, is shown. In operation, method 600 may include determining (block 605) that a device is located at a location for more than a threshold amount of time. In this example, the threshold amount of time may refer to the dwell time for a device at a location, thereby allowing visitor devices to be separated from passerby devices, as explained in detail above.

In operation, method 600 may include identifying (block 610) that the device is a moving candidate based on a percentage of times a plurality of signal strength values for the device fall inside a baseline interval. In certain implementations, the plurality of signal strength values may be a plurality of RSSI values. As explained above, the signal strength values for the device and an access point may be baselined, thereby providing a signal strength interval for the device at the access point. Based on the number of times the signal strength values for the device fall within the signal strength interval, the device may be determined to be fixed or a moving candidate. For example, if the signal strength values fall within a baseline interval for the signal strength values for the device more than 90 percent of the time, the device may be determined to be fixed. Accordingly, if the signal strength values fall outside the baseline interval for the signal strength values for the device less than 90 percent of the time, the device may be identified as a moving candidate. As explained above, if baselining the signal strength values result in more than one interval, the device may also be considered a moving candidate.

In operation, method 600 may include determining (block 615) a most frequent pattern set of signal strength values for the device. To determine whether the device is fixed or moving, a set of signal strength intervals for the device and an access point may be generated. The signal strength intervals may then be mined, as explained in detail above, to determine the most frequent patterns within which the signal strength values fall. For example, signal strength values may fall within a specific range as defined by the signal strength interval. In one implementation a signal strength interval may be [−40 dBm, −45 dBm], and may include a plurality of signal strength values that range between −40 dBm and −45 dBm.

In operation, method 600 may include classifying (block 620) the device as fixed if the most frequent pattern set of signal strength value for the device incudes at least one overlapping interval. An overlapping interval may include either a plurality of intervals with the same most frequent set of signal strength values. As such, each interval in the most frequent pattern set of signal strength values may be the same. In other implementations, each interval in the most frequent pattern set of signal strength values may have at least one overlapping interval, e.g., [−40 dBm, −45 dBm] and [−45 dBm, −50 dBm], as both intervals include −45 dBm.

In operation, method 600 may include classifying (block 625) the device as moving if the most frequent pattern set of signal strength values for the device includes at least one non-overlapping interval. A non-overlapping interval refers to a plurality of intervals that include at least one interval that does not overlap with another interval. For example, intervals [−40 dBm, −45 dBm], [−50 dBm, −55 dBm], and [−30 dBm, −35 dBm] do not include an overlapping interval. Similarly, [−40 dBm, −45 dBm], [−70 dBm, −75 dBm], and [−40 dBm, −45 dBm] include at least one non-overlapping interval. As such, in either example, the device may be classified as moving.

In certain implementations a visitor count at a location may be determined based on the classifying the device as either fixed or moving. If the device is classified as fixed, the device may be removed from consideration as being a visitor, thereby increasing the accuracy of the visitor count. Similarly, by identifying a device as moving, false positives may be removed from the visitor count, thereby providing a more accurate visitor count.

In certain situations, a device that is classified as moving may be classified as a visitor, but should actually be classified as fixed, due to special considerations. For example, an employee at a location may be moving throughout the location while having a device that is sending probe requests to the access points. The device may thereby be classified as a moving device, while not being a visitor. In order to remove such inconsistencies, the time a device is at the location may be included, in order to remove the device, while moving, from the visitor count. As such, dwell time and/or other metrics may be used to classify devices as fixed even if they exhibit signs of being moving.

Figure 7:
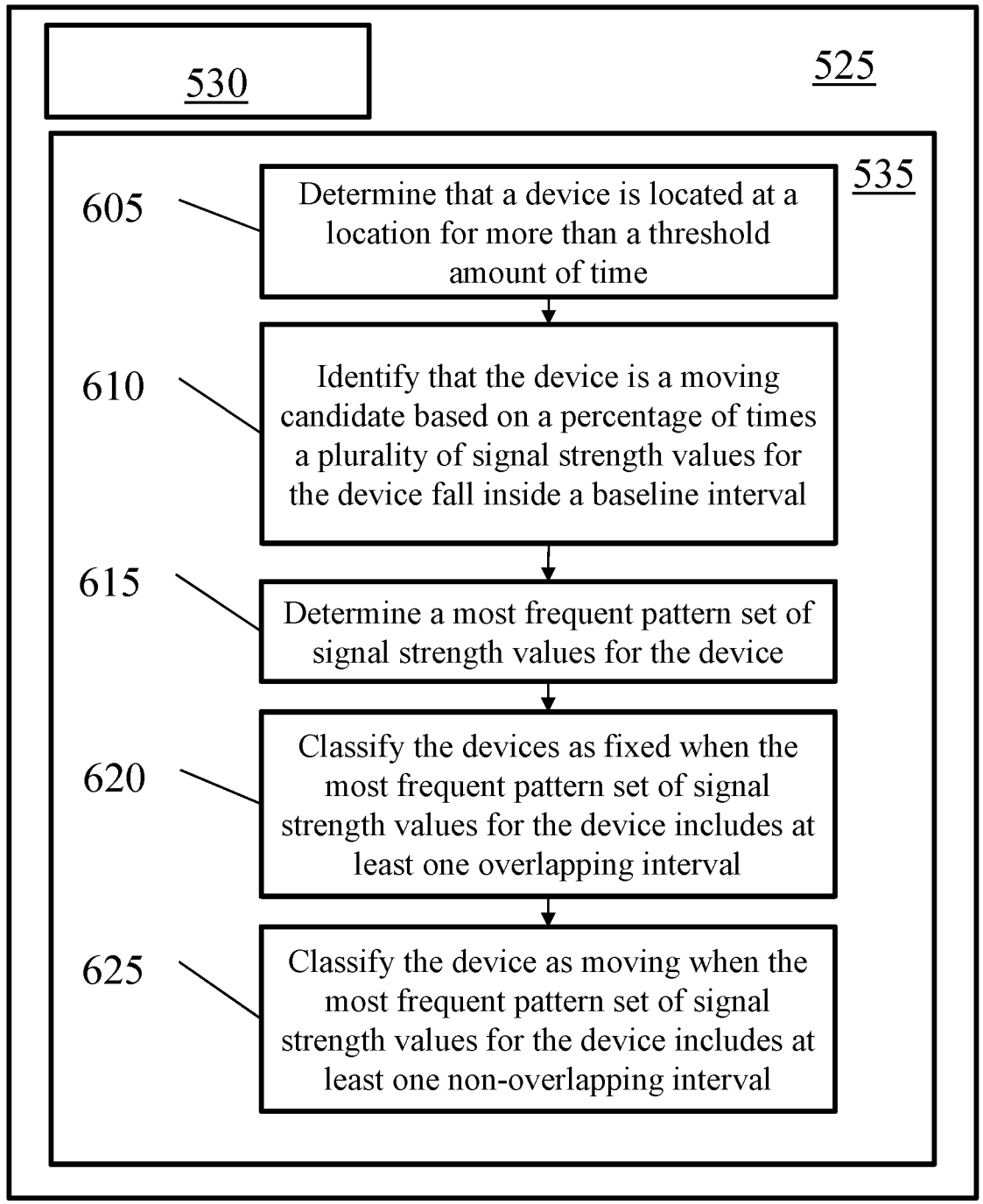
FIG. 7 is an example computing device with a hardware processor and accessible machine-readable instructions, according to one or more examples of the present disclosure.

Turning now to FIG. 7, an example computing device with a hardware processor and accessible machine-readable instructions is shown in accordance with one or more examples of the present disclosure. FIG. 7 provides similar structural components discussed above with respect to FIG. 5, and as such, for purposes of clarity, only the differences in the figures will be discussed herein. FIG. 7 provides an example computing device 525, with a hardware processor 530, and accessible machine-readable instructions stored on a machine-readable medium 535 for managing data as discussed above with respect to one or more disclosed example implementations. FIG. 7 illustrates computing device 525 configured to perform the flow described in blocks 605, 610, 615, 620, and 625, discussed in detail with respect to FIG. 6.

Figure 8:
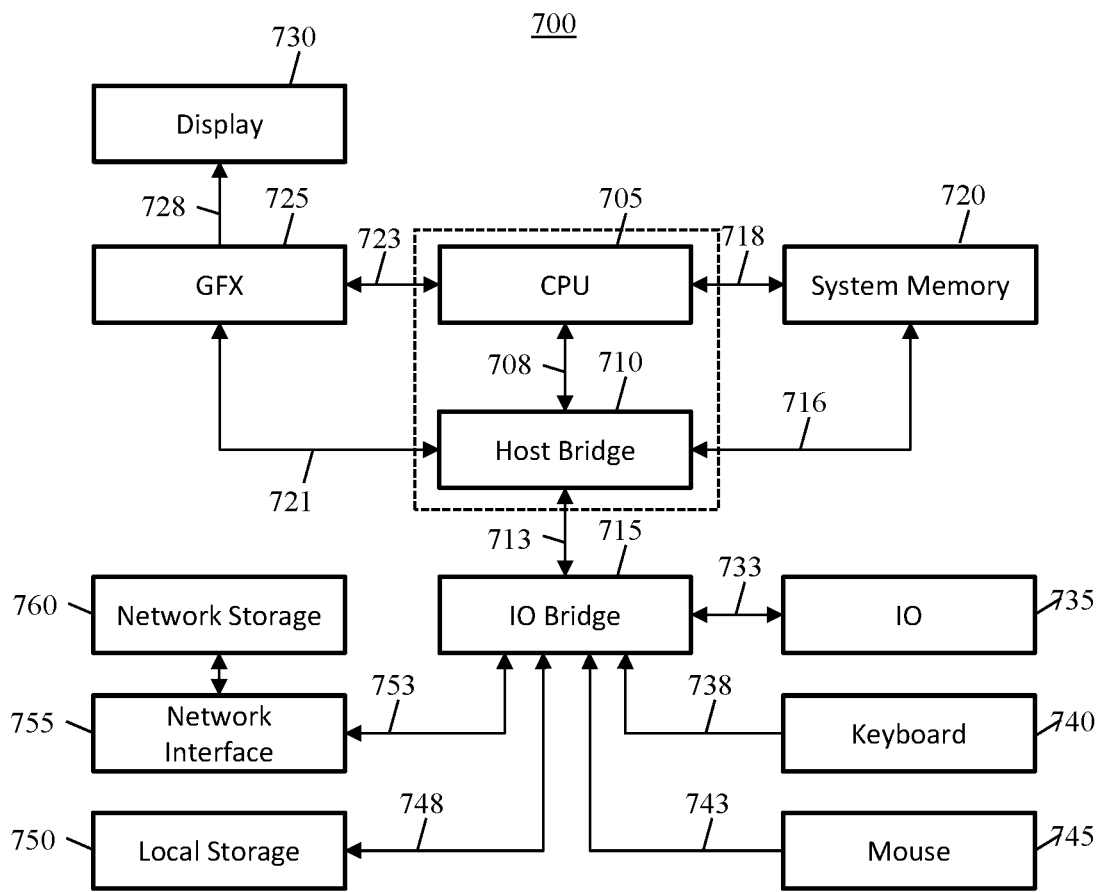
FIG. 8 is a schematic representation of a computer processing device that may be used to implement functions and methods, according to one or more examples of the present disclosure.

Turning now to FIG. 8, a schematic representation of a computing system 700 that may be used to implement functions and processes in accordance with one or more examples of the present disclosure is shown. FIG. 8 illustrates a computing system 700 that may be used to implement the systems, methods, and processes of this disclosure. For example, computing system 700 illustrated in FIG. 8 could represent a client device or a physical server device and include either hardware or virtual processor(s) depending on the level of abstraction of the computing device. In some instances (without abstraction), computing system 700 and its elements, as shown, in FIG. 8, each relate to physical hardware. Alternatively, in some instances one, more, or all of the elements could be implemented using emulators or virtual machines as levels of abstraction. In any case, no matter how many levels of abstraction away from the physical hardware, computing device 700 at its lowest level may be implemented on physical hardware. In one implementation, computing system 700 may allow a subscriber to remotely access one or more data centers. Similarly, the management tool used by the subscriber may include a software solution that runs on such a computing system 700.

FIG. 8 shows a computing system 700 in accordance with one or more examples of the present disclosure. Computing system 700 may be used to implement aspects of the present disclosure, such as an orchestrator, a gateway manager, a cloud monitor, a local storage, a cloud-based storage, or any other device that may be used implementing the systems and methods for managing data discussed herein. Computing system 700 may include one or more central processing units (singular "CPU" or plural "CPUs") 705 disposed on one or more printed circuit boards (not otherwise shown). Each of the one or more CPUs 705 may be a single-core processor (not independently illustrated) or a multi-core processor (not independently illustrated). Multi-core processors typically include a plurality of processor cores (not shown) disposed on the same physical die (not shown) or a plurality of processor cores (not shown) disposed on multiple die (not shown) that are collectively disposed within the same mechanical package (not shown). Computing system 700 may include one or more core logic devices such as, for example, host bridge 710 and input/output ("IO") bridge 715.

CPU 705 may include an interface 708 to host bridge 710, an interface 718 to system memory 720, and an interface 723 to one or more IO devices, such as, for example, graphics processing unit ("GFX") 725. GFX 725 may include one or more graphics processor cores (not independently shown) and an interface 728 to display 730. In certain examples, CPU 705 may integrate the functionality of GFX 725 and interface directly (not shown) with display 730. Host bridge 710 may include an interface 708 to CPU 705, an interface 713 to IO bridge 715, for examples where CPU 705 does not include interface 718 to system memory 720, an interface 716 to system memory 720, and for examples where CPU 705 does not include integrated GFX 725 or interface 723 to GFX 725, an interface 721 to GFX 725. One of ordinary skill in the art will recognize that CPU 705 and host bridge 710 may be integrated, in whole or in part, to reduce chip count, motherboard footprint, thermal design power, and power consumption. IO bridge 715 may include an interface 713 to host bridge 710, one or more interfaces 733 to one or more IO expansion devices 735, an interface 738 to keyboard 740, an interface 743 to mouse 745, an interface 748 to one or more local storage devices 750, and an interface 753 to one or more network interface devices 755.

Each local storage device 750 may be a solid-state memory device, a solid-state memory device array, a hard disk drive, a hard disk drive array, or any other non-transitory computer readable medium. Each network interface device 755 may provide one or more network interfaces including, for example, Ethernet, Fibre Channel, WiMAX, WLAN, Wi-Fi®, Bluetooth®, or any other network protocol suitable to facilitate networked communications. Computing system 700 may include one or more network-attached storage devices 760 in addition to, or instead of, one or more local storage devices 750. Network-attached storage device 760 may be a solid-state memory device, a solid-state memory device array, a hard disk drive, a hard disk drive array, or any other non-transitory computer readable medium. Network-attached storage device 760 may or may not be collocated with computing system 700 and may be accessible to computing system 700 via one or more network interfaces provided by one or more network interface devices 755.

One of ordinary skill in the art will recognize that computing system 700 may include one or more application specific integrated circuits ("ASICs") that are configured to perform a certain function, such as, for example, hashing (not shown), in a more efficient manner. The one or more ASICs may interface directly with an interface of CPU 705, host bridge 710, or IO bridge 715. Alternatively, an application-specific computing system (not shown), sometimes referred to as mining systems, may be reduced to only those components necessary to perform the desired function, such as hashing via one or more hashing ASICs, to reduce chip count, motherboard footprint, thermal design power, and power consumption. As such, one of ordinary skill in the art will recognize that the one or more CPUs 705, host bridge 710, IO bridge 715, or ASICs or various sub-sets, super-sets, or combinations of functions or features thereof, may be integrated, in whole or in part, or distributed among various devices in a way that may vary based on an application, design, or form factor in accordance with one or more example examples. As such, the description of computing system 700 is merely exemplary and not intended to limit the type, kind, or configuration of components that constitute a computing system suitable for performing computing operations, including, but not limited to, hashing functions. Additionally, one of ordinary skill in the art will recognize that computing system 700, an application specific computing system (not shown), or combination thereof, may be disposed in a standalone, desktop, server, or rack mountable form factor.

One of ordinary skill in the art will recognize that computing system 700 may be a cloud-based server, a server, a workstation, a desktop, a laptop, a netbook, a tablet, a smartphone, a mobile device, and/or any other type of computing system in accordance with one or more example examples.

Examples in the present disclosure may also be directed to a non-transitory computer-readable medium storing computer-executable instructions and executable by one or more processors of the computer via which the computer-readable medium is accessed. A computer-readable media may be any available media that may be accessed by a computer. By way of example, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Note also that the software implemented aspects of the subject matter claimed below are usually encoded on some form of program storage medium or implemented over some type of transmission medium. The program storage medium is a non-transitory medium and may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The claimed subject matter is not limited by these aspects of any given implementation.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A non-transitory computer readable medium comprising computer executable instructions stored thereon that, when executed by a processor in a source system, cause the processor to:
   store signal strength data for a plurality of devices having a dwell time over a dwell time threshold, the signal strength data indicating a strength of signal transmitted by at least one of the plurality of devices to at least one access point in a network;
   baseline the signal strength data for each of the plurality of devices having the dwell time over the dwell time threshold, baselining the signal strength data including classifying each of the plurality of devices using a support vector machine;
   determine that a device is fixed when the baseline of the signal strength data for the device returns a single interval and a predefined percentage of signal strength values fall in the single interval;
   identify a moving candidate device from the plurality of devices when the baseline of the signal strength data for the moving candidate device returns a plurality of intervals;
   identify a pattern of signal strength intervals for the moving candidate device with fixed devices being removed from the pattern of signal strength intervals; and
   when the pattern of signal strength intervals for the moving candidate device has an overlapping value, determine that the moving candidate device is fixed, and when the pattern of signal strength intervals includes at least one non-overlapping value, determine that the moving candidate device is moving.

2. The non-transitory machine-readable storage medium of claim 1, wherein the predefined percentage of signal strength values is at least 90.

3. The non-transitory machine-readable storage medium of claim 1, further comprising instructions that when executed by the processor cause the processor to determine that the device is the moving candidate device when the baseline of the signal strength data returns the single interval and the predefined percentage of signal strength values do not fall in the single interval.

4. The non-transitory machine-readable storage medium of claim 1, further comprising instructions that when executed by the processor cause the processor to update a set of fixed devices by repeating the instructions to:
   baseline the signal strength data for each of the plurality of devices having the dwell time over the dwell time threshold;
   determine that the device is fixed when the baseline of the signal strength data for the device returns the single interval and the predefined percentage of signal strength values fall in the single interval;
   identify the moving candidate device from the plurality of devices when the baseline of the signal strength data for the moving candidate device returns the plurality of intervals;
   identify the pattern of signal strength intervals for the moving candidate device; and
   when the pattern of signal strength intervals for the moving candidate device has the overlapping value, determine that the moving candidate device is fixed, and when the pattern of signal strength intervals includes at least one non-overlapping value, determine that the moving candidate device is moving; and
   maintain the set of fixed devices in a database.

5. The non-transitory machine-readable storage medium of claim 1, further comprising instructions that when executed by the processor cause the processor to store the fixed devices in a database and determine at least one device in a set of fixed devices in the database is not functional.

6. The non-transitory machine-readable storage medium of claim 1, further comprising instructions that when executed by the processor cause the processor to determine that a moving candidate device is fixed based on having the dwell time over the dwell time threshold.

7. The non-transitory machine-readable storage medium of claim 1, further comprising instructions that when executed by the processor cause the processor to receive the signal strength data from the at least one access point.

8. The non-transitory machine-readable storage medium of claim 1, further comprising instructions that when executed by the processor cause the processor to determine, for each of the plurality of devices, whether the device is a visitor device.

9. The non-transitory machine-readable storage medium of claim 8, further comprising instructions that when executed by the processor cause the processor to determine an average dwell time based on the dwell times of each of the visitor devices.

10. A method for classifying devices, the method comprising:
    determining that a device is located at a location for more than a threshold amount of time;
    identifying that the device is a moving candidate based on a percentage of times a plurality of signal strength values for the device fall inside a baseline interval, wherein the baseline interval is determined, in part, by classifying each of the plurality of devices using a support vector machine;
    determining a most frequent pattern set of signal strength values for the device with fixed devices being removed from the signal strength values;
    classifying the device as fixed when the most frequent pattern set of signal strength values for the device includes at least one overlapping interval; and
    classifying the device as moving when the most frequent pattern set of signal strength values for the device includes at least one non-overlapping interval.

11. The method of claim 10, wherein the at least one overlapping interval includes a plurality of intervals with the same most frequent set of signal strength values.

12. The method of claim 10, further comprising determining a visitor count based on the classifying the device as fixed and the classifying the device as moving.

13. The method of claim 10, further comprising determining the device is fixed based on the time of the device at the location after classifying the device as moving when the most frequent pattern set of signal strength values for the device includes at least one non-overlapping interval.

14. The method of claim 10, generating signal strength intervals for the device, wherein the determining the most frequent pattern set of signal strength values for the devices is based on the generated signal strength intervals.

15. The method of claim 10, further comprising:
storing a set of fixed devices in a database; and
determining at least one device in the set of fixed devices is malfunctioning based on the at least one device being removed from the database.

16. The non-transitory machine-readable storage medium of claim 1, wherein the network is a wireless metropolitan area network ("WPAN").

17. The non-transitory machine-readable storage medium of claim 1, further comprising instructions that when executed by the processor cause the processor to:
when the device that is fixed stops sending the signal strength data, remediate a problem with the device that is fixed.

18. A system comprising:
a memory; and
one or more processors, wherein the memory comprises computer executable instructions stored thereon that, when executed by the one or more processors, cause the one or more processors to:
store signal strength data for a plurality of devices having a dwell time over a dwell time threshold, the signal strength data indicating a strength of signal transmitted by at least one of the plurality of devices to at least one access point in a network;
baseline the signal strength data for each of the plurality of devices having the dwell time over the dwell time threshold, baselining the signal strength data including classifying each of the plurality of devices using a support vector machine;
determine that a device is fixed when the baseline of the signal strength data for the device returns a single interval and a predefined percentage of signal strength values fall in the single interval;
identify a moving candidate device from the plurality of devices when the baseline of the signal strength data for the moving candidate device returns a plurality of intervals;
identify a pattern of signal strength intervals for the moving candidate device with fixed devices being removed from the pattern of signal strength intervals; and
when the pattern of signal strength intervals for the moving candidate device has an overlapping value, determine that the moving candidate device is fixed, and when the pattern of signal strength intervals includes at least one non-overlapping value, determine that the moving candidate device is moving.

* * * * *